DATA PROCESSING SYSTEM

INVENTOR
MARION G. PORTER
BY
[signature]
ATTORNEY

United States Patent Office 3,535,695
Patented Oct. 20, 1970

3,535,695

DATA PROCESSING SYSTEM INCLUDING ADDER HAVING FORCED SETTLE OUT TIME

Marion G. Porter, Phoenix, Ariz., assignor to General Electric Company, a corporation of New York Filed July 14, 1967, Ser. No. 653,496
Int. Cl. G06f 7/385
U.S. Cl. 340—172.5 7 Claims

ABSTRACT OF THE DISCLOSURE

A data processing system including an arithmetic unit in communication with a data processing unit provides the capability of providing the execution of arithmetic operations upon data supplied thereto by the processing unit in a manner less time-consuming to the overall system operation.

BACKGROUND OF THE INVENTION

The present invention relates generally to electronic data processing systems and more particularly to the arithmetic section or portion of a data processing system.

Data processing systems having arithmetic capabilities normally possess an arithmetic section or portion which further includes an adder capable of forming the algebraic sum of a plurality, normally two, of information items. These information items are often digital data in a configuration represented by binary bits (1's and 0's), the format of which is representative of some form of information; e.g., a numerical quantity. It is customary to retain within temporary storage means or registers which are located within or in communication with the arithmetic portion, two such units of information. At an appropriate time, signals which are representative of either or both of the units of information are supplied from the registers to the adder which provides, at its outputs, signals representing the input signals.

The adder most prevalent in the art is the parallel adder which is comprised of a plurality of stages with each of the stages capable of receiving a signal from each of the registers. Each signal thus received represents a binary bit being retained within the register. One of the output signals of each adder stage can represent a carry signal which may be analogized to the "carry" one achieves, when in the decimal system, he adds one to nine to "put down zero and carry the one." In the parallel adder, this carry signal is supplied as an input to the following adder stage. In the customary operation of a parallel adder all input stages are simultaneously supplied with signals from each of the two registers. As such, carry signals will normally generate from some of the stages and not from others. Additionally, the carry which is generated in one stage may propagate through several stages before it reaches an adder input signal configuration which will not cause a carry to be generated from that stage. As such, it is seen that a finite amount of time must be allocated, in a data processing system, when the adder is being utilized for permitting all carries to propagate through the adder as far as they will go. This time is normally referred to as the "settle out time" and is the time period required for the adder of the above described nature to reach a stable or static state.

In the determination of the amount of time for allotment for adder settle out time, that most prevailing in the prior art is to allow sufficient time after applying input signals to the adder to permit a "worst case" condition for adder settle out. The "worst case" condition will be a time sufficient for a carry signal initiated in the least significant stage of the adder to propagate the full length thereof to the most significant stage. While this method is accurate in that the adder in each case has sufficient time to settle and there is little danger of reading the output signals of the adder while they are still subject to change, it is particularly inefficient in certain situations. For example, when a single binary word is being transferred or shifted through the adder there is no possibility of a true carry signal being generated. However, because of transient or spurious signals which develop in electronic circuitry when the voltage levels applied as inputs thereto are varied, it is possible to develop a spurious signal which will propagate the length of the parallel adder in a manner much like that of a true carry signal. Such a spurious signal would require the same amount of time as a true carry signal to propagate through the adder and will affect the output signals in the same way. Therefore, the same time is normally allocated to permit this propagation and to permit the adder to completely settle out before reading of the adder outputs. It is, however, to be realized that the time thus allocated is wasted in that a true carry cannot possibly be generated in any of the adder stages.

SUMMARY OF THE INVENTION

The present invention alleviates this problem of the prior art and permits, when appropriate, the data processing system to read the adder outputs at a time earlier than that which would normally be allowed for the "worst case" condition. This is accomplished when only single inputs are supplied to the several adder stages thus eliminating the possibility of a true carry signal being generated. Suitable means are provided for supplying, to selected ones of the stages of the adder, a special signal representing the absence of a true carry signal. Inasmuch as the application of this special signal is immediate to selected stages of the adder, its propagation through the several stages will begin immediately from several points and it is thus seen that the adder will be forced to settle out to a stable state at an earlier time than would otherwise be possible to thus reduce the amount of time wasted and to reduce the average settle out time for a plurality of adder uses.

It is, therefore, an object of the present invention to provide a data processing system having enhanced arithmetic capabilities.

Another object is to provide a data processing system including means for the reduction of the average amount of time required for arithmetic operations.

Still another object is to provide, within the arithmetic portion of a data processing system, an adder having in association therewith means for reducing adder settle out time to an absolute minimum when the adder is provided with only a single input.

A still further object is to provide means in association with a binary adder for selectively forcing the adder to settle out in a small amount of time.

The foregoing and other objects will become apparent as this description proceeds and the features of novelty which characterize the invention will be pointed out in particularity in the claims annexed to and forming a part of this specification.

BRIEF DESCRIPTION OF DRAWING

For a better understanding of the invention, reference may be had to the accompanying drawing, in which.

Figure 1:
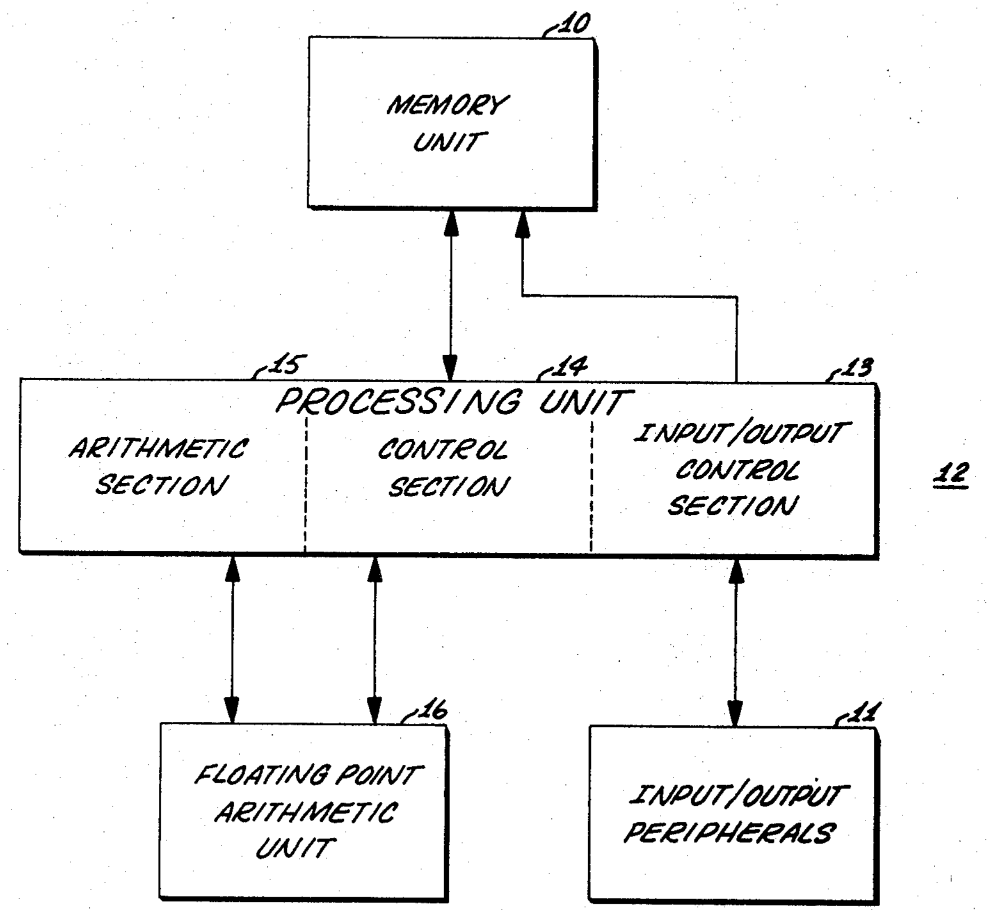
FIG. 1 is a block diagram illustrating the major components of the data processing system of the present invention.

For a complete description of the system of FIG. 1 and of my invention, reference is made to U.S. patent application, Ser. No. 653,495, filed July 14, 1967, entitled "Data Processing System Having Improved Divide Algorithm" by Marion G. Porter and assigned to the assignee of the present invention. More particularly, attention is directed to FIGS. 11, 12, 13 and 14 of the drawings and to the specification beginning at page C-138, line 9, and ending at page C-144, line 20, inclusive of U.S. patent application Ser. No. 653,495 which are incorporated herein by reference and made a part hereof as if fully set forth herein.

What is claimed is:

1. In a data processing system of the type including a memory for containing a plurality of information items, a data processing unit in communication with said memory for retrieving selected ones of said information items from said memory and an arithmetic means in communication with said data processing unit for performing arithmetic operations on information items delivered thereto and having a binary adder having a plurality of stages each of which possesses a plurality of input and output terminals, the improvement in said arithmetic means comprising; means for selectively applying signals representative of binary data to a portion of said input terminals; connecting means extending between adjacent stages and connecting a first output terminal of one stage of said adder to an input terminal of the next succeeding higher order stage of said adder whereby carry signals may propagate from lower to higher order adder stages; and gating means in selected ones of said connecting means for selectively applying a signal to the input of the higher order stage indicative of the absence of a carry signal to said higher order stage when said adder stages receive signals representing only a single unit of binary data.

2. A data processing system comprising: a memory having a plurality of addressable storage locations each containing an information item; a data processing unit in communication with said memory for retrieving selected ones of said information items from said memory; and an arithmetic means in communication with said data processing unit for performing arithmetic operations on information items delivered thereto, said arithmetic means including, first and second storage means each capable of retaining a plurality of bits of binary information collectively comprising a unit of digital data and of providing signals representative of said unit of data, adder means in communication with said first and second storage means capable of arithmetically combining input signals representing the respective contents of said storage means, said adder means comprising a plurality of stages corresponding in number to the number of bits to be combined, each of said stages including a plurality of output terminals for providing output signals the states of which are dependent upon the states of the input signals applied to said stages, connecting means extending between adjacent adder stages from an output terminal of a first stage to an input terminal of the next succeeding higher order stage whereby a carry signal generated in a first stage may propagate to the next succeeding higher order stage and form an input signal thereto, and means including an AND-gate capable of being disabled, independently of the value of said input signals forming a part of selected ones of said connecting means, to thereby force a signal representative of the absence of a carry signal to the next succeeding stage when only signals representing a single unit of binary data are supplied to said adder.

3. An arithmetic unit for performing arithmetic operations on information items comprising: first, second and third storage means each capable of retaining a plurality of binary bits representative of information items; an adder including a plurality of stages capable of combining selected signals from said storage means representative of said information items, each of said adder stages having an output carry terminal and an input carry terminal; means for selectively applying said selected signals to said adder from said storage means; connecting means extending between adjacent stages of said adder and connecting the output carry terminal of one stage to the input carry terminal of the next succeeding higher order stage whereby carry signals may propagate from lower to higher order adder stages; and a carry signal inhibit means disposed in selected ones of said connecting means, said carry signal inhibit means responsive to an input inhibit signal whereby a signal is applied to the carry input terminal of the next higher order stage indicative of the absence of a carry signal thereto when said adder stages receive signals representative of information items from only a selected one of said storage means.

4. An arithmetic unit comprising: an adder having a plurality of stages, each of said stages including first, second and third input terminals and an output terminal; a plurality of storage means each capable of retaining an information item and each providing output signals representative of said information item; means for selectively applying said output signals from said plurality of storage means to said adder; control means for generating a force adder carry inhibit signal when signals representative of said information item are applied to said adder from a one of said plurality of storage means; connecting means interconnecting the output terminal of each stage to the third input terminal of the next succeeding higher order stage whereby carry signals may propagate through said adder from lower to higher order adder stages; and a plurality of inhibit means, individual ones of said plurality of inhibit means disposed in selected ones of said connecting means, each of said inhibit means receiving a carry signal from the output terminal of an adjacent stage in a first instance and said force adder carry inhibit signal from said control means in a second instance, said inhibit signal prohibiting the propagation of a carry signal through said plurality of inhibit means and causing each of said plurality of inhibit means to simultaneously apply a signal representative of the absence of a carry to the third input terminal of an adder stage associated with each of said plurality of inhibit means.

5. In an arithmetic unit of the type including an adder having a plurality of stages for arithmetically combining signals representative of information items and having a plurality of storage means for retaining said information items, the improvement in said arithmetic unit comprising: means for selectively applying data signals representative of said information items to said adder; control means for generating an inhibit signal when data signals from only a selected one of said storage means are transferred to said adder; connecting means extending between adjacent stages of said adder and connecting a carry output terminal of one stage to an input carry terminal of the next succeeding higher order stage of said adder whereby carry signals are propagated from lower to higher order adder stages; and a logic element disposed in at least one of said connecting means for receiving a carry signal from an adjacent lower order adder stage, said logic element further receiving said inhibit signal from said control means, said element applying a signal representative of the absence of a carry signal to the carry input terminal of the next succeeding higher order stage when said inhibit signal is applied to said logic element.

6. In a data processing system, means capable of performing arithmetic operations on digital data including: a binary adder comprised of a plurality of stages each capable of combining first, second and third input signals supplied thereto, said first and second input signals representative of binary data and said third input signal representative of a carry signal from an output terminal of the next adjacent lower order stage; means for selectively supplying said first and second input signals to said binary adder; connecting means interconnecting successive stages of said adder for transmitting said carry signal therebetween; and means in association with said connecting means for selectively forcing a signal indicative of the absence of a carry signal between selected stages of said adder when only signals representing a single unit of digital data are supplied to said adder.

7. A data processing system comprising: a memory having a plurality of addressable storage locations each containing an information item; a data processing unit in communication with said memory for retrieving selected ones of said information items from said memory; an arithmetic means in communication with said data processing unit for performing a plurality of algorithms on information items delivered thereto, said arithmetic means including, a control means; an adder comprised of a plurality of stages each capable of arithmetically combining a plurality of separate information items, said adder segmented into groups designated as areas, each area including at least one adder stage; means responsive to signals from said control means for selectively supplying data signals representative of information items to said adder, said adder normally requiring a first time period to achieve a stable state of operation after the receipt of said data signals; connecting means extending between adjacent adder stages from an output carry terminal of a first stage to an input carry terminal of the next succeeding higher order stage whereby a carry signal present at the carry output terminal of a first stage may propagate to the input carry terminal of a next higher order stage and form an input signal thereto; and a plurality of inhibit gates, individual ones of said plurality of inhibit gates disposed in selected ones of said connecting means for connecting the adder stages of adjacent areas, said gates simultaneously responsive to a carry inhibit signal from said control means whereby a carry signal from a first adder stage output carry terminal will propagate through said inhibit gate to the input carry terminal of a next succeeding higher order stage when said carry inhibit signal is in a first state, and further responsive to a second state of said carry inhibit signal to provide an indicia representative of the absence of a carry signal to the input carry terminal of a next succeeding higher order adder stage, said indicia causing the stages in each of said areas to achieve a stable state of operation in a shorter time period than said first time period, said carry inhibit signal achieving said second state during the performance of said algorithms when only a one of said information items is supplied to said adder stages.

References Cited

UNITED STATES PATENTS

| | | | |
|---|---|---|---|
| 3,371,195 | 2/1968 | Bolt | 235—175 |
| 3,166,669 | 1/1965 | Cochrane | 235—175 |
| 3,198,939 | 8/1965 | Helbig | 235—175 |

PAUL J. HENON, Primary Examiner

R. F. CHAPURAN, Assistant Examiner

U.S. Cl. X.R.

235—175